United States Patent [19]

Dean

[11] Patent Number: 5,465,487
[45] Date of Patent: Nov. 14, 1995

[54] METHOD OF MAKING A RIGID FRAME CONSTRUCTION

[76] Inventor: Charles W. Dean, 2444 McGregor Blvd., Fort Myers, Fla. 33901

[21] Appl. No.: 109,923

[22] Filed: Aug. 23, 1993

[51] Int. Cl.⁶ .................................................. B23P 15/00
[52] U.S. Cl. .................................... 29/897.35; 29/897.3
[58] Field of Search ............................ 29/897.3, 897.31, 29/897.312, 897.32, 897.33, 897.34, 897.35; 52/726.1, 726.2, 729

[56] References Cited

U.S. PATENT DOCUMENTS

| | | | |
|---|---|---|---|
| 1,813,761 | 7/1931 | Pickett . | |
| 1,837,088 | 12/1931 | Watson | 29/897.35 |
| 2,277,615 | 3/1942 | Townsend . | |
| 2,617,179 | 11/1952 | Burke | 29/897.35 |
| 2,990,038 | 6/1961 | Diamond . | |
| 3,300,839 | 1/1967 | Lichti | 52/729 |
| 3,431,806 | 3/1969 | Peterson . | |
| 4,129,974 | 12/1975 | Ojaluo | 52/729 |
| 5,308,675 | 5/1994 | Crane et al. | 52/729 |

FOREIGN PATENT DOCUMENTS

| | | | |
|---|---|---|---|
| 5101620 | 8/1980 | Japan | 52/726.2 |

*Primary Examiner*—Irene Cuda
*Attorney, Agent, or Firm*—Shoemaker and Mattare, Ltd.

[57] ABSTRACT

Generally trapezoidal web sections of non-uniform shape for fabricating structural I-section beams having varying bending modulus are sheared from a continuous roll of metal stock by a shear whose platen is oscillated, as a series of pieces are cut from a length of metal sheet or plate, about an axis perpendicular to the plane of the stock material. The platen angle is determined and controlled by a computer to which design criteria are fed.

4 Claims, 5 Drawing Sheets

METHOD OF MAKING A RIGID FRAME CONSTRUCTION

BACKGROUND OF THE INVENTION

This invention relates generally to the field of metal working, and more particularly to an automated system of constructing frames of non-constant modulus.

The substructure of a metal building typically includes an array of main load resisting members, commonly called rigid frames. As the bending moment experienced by each such frame varies greatly over its length, tapered I-section beams are commonly used for rigid frames. Tapered beams avoid the material waste and added weight that would result from using beams of uniform modulus, designed to withstand the maximum bending moment experienced.

In the design of tapered beams, the required modulus is calculated from the design bending moment at each spot along the beam, and the cross-section of the beam at that point is designed to provide the required modulus.

A common way of varying the modulus of an I-beam is to vary the width of a uniformly thick web extending between the two flanges of the beam; the flanges may be of uniform width and thickness. U.S. Pat. No. 2,990,038 may be representative of such techniques, as it discloses a beam formed from non-orthogonal segments, the web thereof being formed of separate plates.

A tapered beam may be built up of a number of tapered webs, and associated flanges. The individual web sections are welded together to the proper column or rafter length, and then the flanges are welded on to create the I-section. Each tapered, generally trapezoidal web section is typically sheared or plasma cut from standard plate material, normally available in rectangular shapes four to five feet wide, and twelve to twenty feet long. Even with properly thought out layouts, a great deal of useless scrap can result. The amount of scrap generated can amount to as much as five percent of the weight of the rigid frame.

In sheet metal work, scrap reduction is a constant consideration, and much attention has been devoted to this problem over the years. Many patents addressing this problem have been awarded. For example, U.S. Pat. No. 1,813,761 describes a scrap-free method of cutting metal fence posts from material, and U.S. Pat. No. 2,990,038 suggests a method of forming structural beams with minimal waste.

SUMMARY OF THE INVENTION

An object of this invention is to reduce or eliminate the production of scrap in the manufacture of tapered I-section frames. The sections from which the frame is constructed are sheared from a coil of steel stock, in widths of four to seven feet, or from rectangular plates, along lines that are generally transverse to the length of the stock. By shearing in alternating sequence pieces which are mirror images, scrap is avoided altogether, where the frame being fabricated is symmetrical about the center plane of the building to be constructed.

One aspect of the invention is a method of fabricating a varying modulus I-section beam comprising flanges interconnected by a web built up from a series of generally trapezoidal sections of uniformly thick metal, the method comprising steps of analyzing design strength requirements and determining an optimum shape for each of the web sections, feeding stock material from a continuous supply thereof to a shear having a rotatable platen, controlling rotation of the platen in accordance with the optimum shapes previously determined while cutting a series of web sections from the stock material, welding the web sections thus produced together to form a built-up web, and then welding flanges to either side of the built-up web, to form an I-section beam.

Another aspect of the invention is an apparatus for carrying out the above method, comprising means for feeding stock material from a coiled supply thereof along a path, a shear disposed along the path, the shear having a platen which is rotatable about an axis perpendicular to the plane of the stock material in the path, and means for controlling rotation of the shear platen, in accordance with predetermined desired web section shapes, so that the platen cuts the material, generally transverse to its length, into the desired shapes without substantial scrap production.

BRIEF DESCRIPTION OF THE DRAWINGS

In the accompanying drawings.

DESCRIPTION OF THE PREFERRED EMBODIMENT

Figure 1:
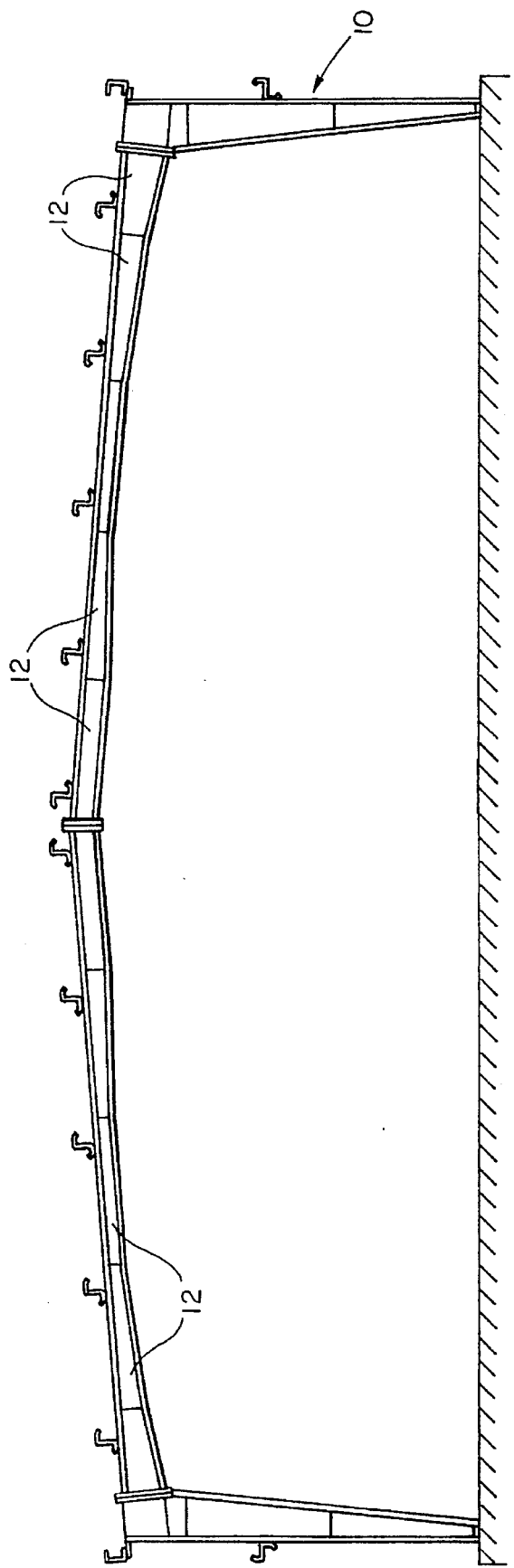
FIG. 1 is a diagrammatic front elevation of a typical rigid frame member for a metal building.
Figure 2:
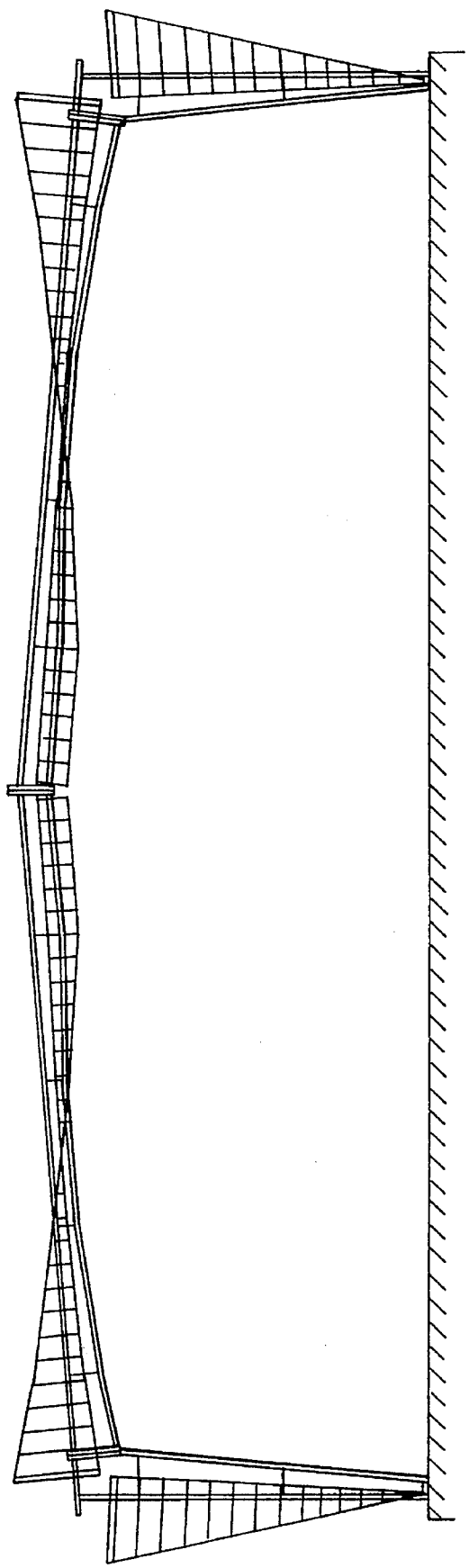
FIG. 2 is a diagram showing calculated bending moments superimposed on the frame of FIG. 1.
Figure 4:
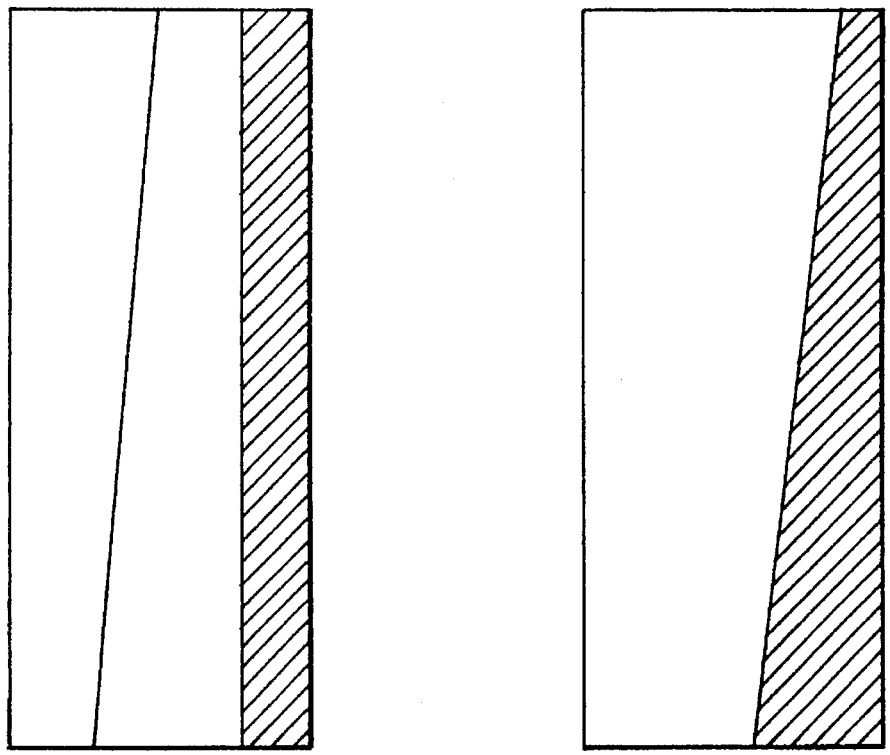
FIG. 4 illustrates a conventional layout for cutting tapered web sections from rectangular plate material.
Figure 3:
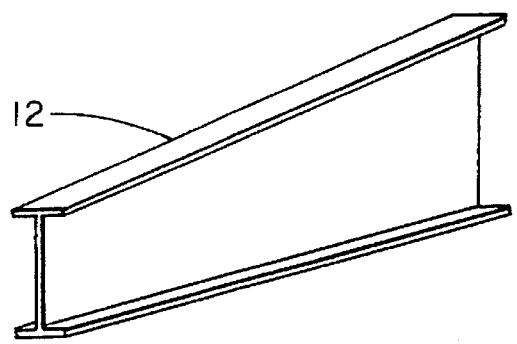
FIG. 3 is a perspective view of a tapered I-section of the beam shown in FIG. 1.
Figure 5:
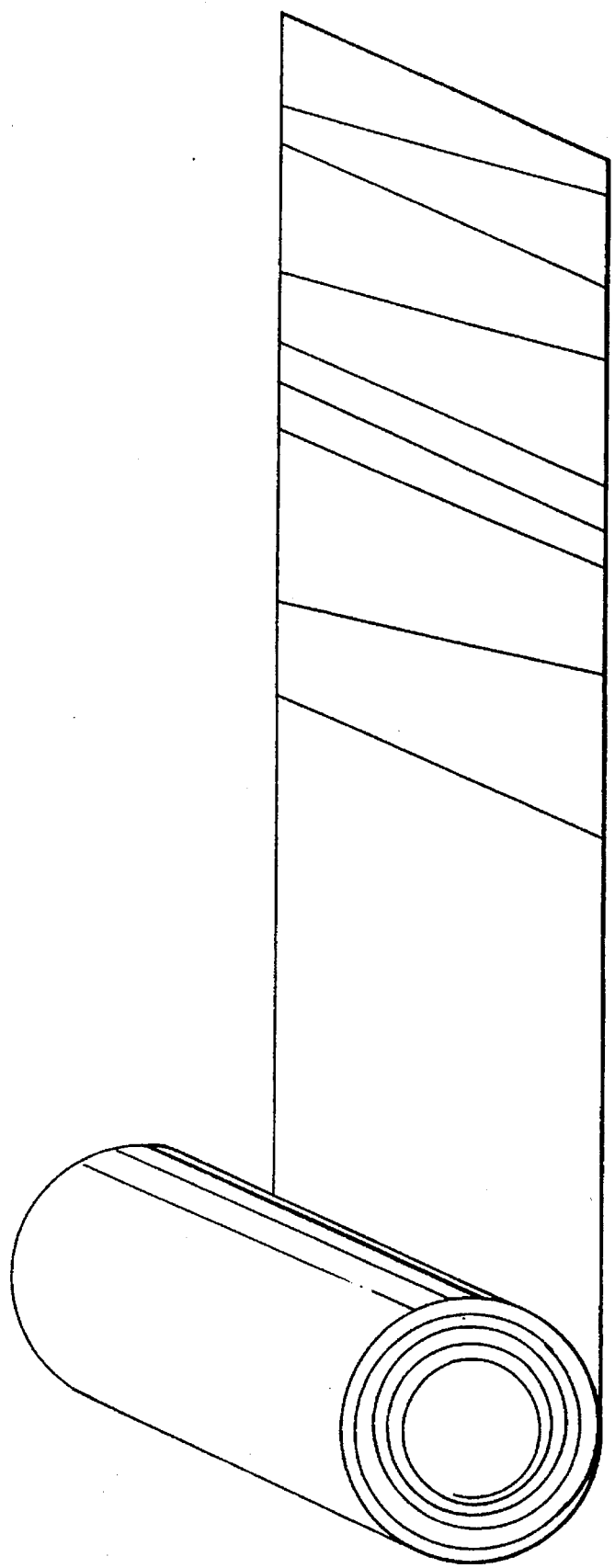
FIG. 5 is a scrap-free layout for cutting tapered web sections from continuous metal stock, in accordance with the invention.

The rigid frame 10 shown in FIG. 1 is built up from a series of tapered I-beam sections 12, as typified by FIG. 3. The correct variation in shape and size of the sections 12, from one end of the frame to the other, is determined from an analysis of bending moments based on certain accepted assumptions, such as maximum wind loading and uniform roof surface loading. The variation in bending moment (apparent in FIG. 2) determines the required strength or modulus of the frame at each point along its length.

According to the present invention, the frame is built up from a series of generally trapezoidal web sections cut from a continuous length of coiled metal stock. The web sections are designed to be about as long as the stock is wide, to avoid scrap production.

Figure 6:
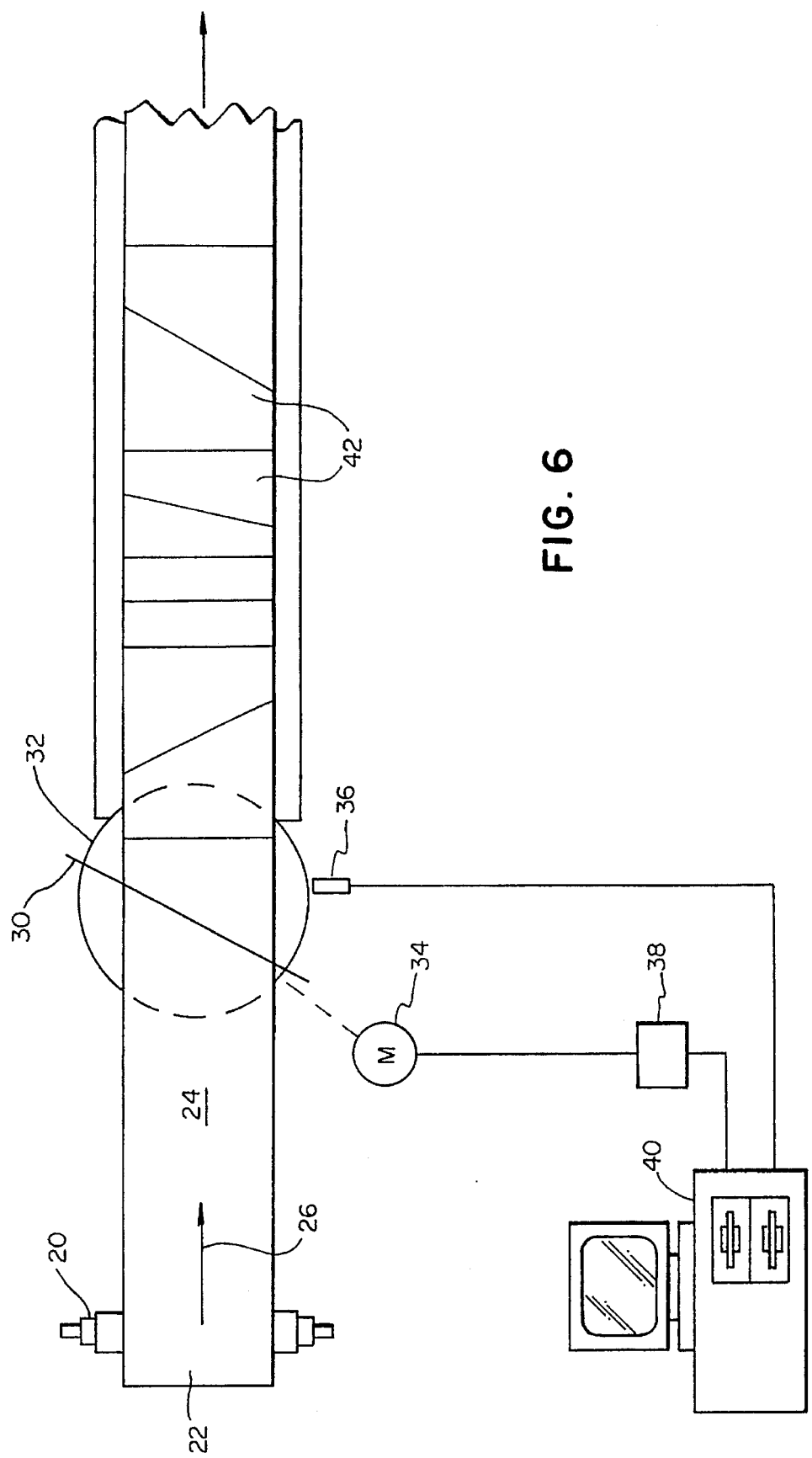
FIG. 6 is a diagrammatic plan view of an apparatus for automatically cutting metal sections from which the rigid frame member is constructed.

The fabrication plant show diagrammatically in FIG. 6 includes means such as a spindle 20 for supporting a coil 22 of stock material, means for drawing material 24 from the coil and feeding it along a linear path 26, and a shear 30 disposed along the path for making cuts generally transverse to the length of the path.

The shear has a platen 32 which can be rotated around a axis perpendicular to the plane of the stock, so that it can make cuts perpendicular to the edges of the stock, or oblique thereto, over a range of angles from the perpendicular. A suitable shear is an HTC #375-8A, modified by adding two additional hydraulic valves for rotational control and a General Electric Series 1 five-unit programmable controller programmed for shear operation, as well as a rotational control valve. The table of the shear has a fabricated steel frame with curved ball conveyor tables on the infeed and outfeed of the shear to facilitate movement.

The orientation of the shear platen is changed automatically by a hydraulic motor 34 (Charlynn #104-1040) and position is monitored by a rotary encoder 36. Position control is performed by a servo type modular controller 38 (Machine Tool Systems #EDC 200) responsive to output from an industrial AT-286 computer 40 into which a database is loaded. The database contains a record for each unique part to be made; each record contains fields containing information on part thickness, width, length, angle of cut, part number and other parameters. On command, the computer initiates automatic continuous production of a series of web pieces, subject to hold or stop instructions from the operator.

In this series of pieces, each adjacent pair of pieces are mirror images; the pieces of each pair lie on opposite sides of an oblique (or perpendicular, if the pieces are rectangular) cut line, and each pair is separated from an adjacent pair by a perpendicular cut line. That is, each pair comprises two pieces which together make up a rectangle, whose width is preferably equal to that of the stock material. In this way, the production of scrap is avoided.

After the web sections for a particular frame have been cut, they are aligned properly, and then welded together end-to-end to form a built-up web having varying width, as for example, the web shown in FIG. 1. Subsequently, flanges of uniform cross-section are welded to either side of the web to complete the structure. The latter step is not illustrated in the drawings.

An advantage of this invention is that it can be used to custom-make rigid frames for any design situation. With suitable additional programming, the computer can be used to generate stress and strain analysis of the frame under hypothetical input conditions such as wind and snow loading. and frame size can be adjusted accordingly to hold maximum stresses within design limits.

We expect the principles of this invention will find use in various fields, and that details may thus be subject to variations in accordance with its use.

Inasmuch as the invention is subject to such modifications and variations, it is intended that the foregoing description and the accompanying drawings shall be interpreted as illustrative of only one form of the invention, whose scope is to be measured by the following claims.

I claim:

1. A method of fabricating a varying modulus I-section beam comprising flanges interconnected by a web built up from a series of generally trapezoidal sections of uniformly thick metal, said method comprising steps of determining an appropriate shape for each of said web sections, feeding stock material from a continuous supply thereof to a shear having a rotatable platen, controlling rotation of the platen in accordance with the web section shapes previously determined while cutting a series of web sections from the stock material, welding the web sections thus produced together to form a built-up web, and then welding flanges to either side of the built-up web, to form an I-section beam.

2. The method of claim 1, wherein each of said web sections is as long as the coil of material is wide, to avoid the production of scrap.

3. The invention of claim 1, wherein said beam is symmetrical about a center plane, so that each of said web sections has a symmetrical counterpart, each such section and its counterpart being cut from a rectangular portion of said stock, one after the other.

4. The invention of claim 1, wherein said determining and controlling steps are carried out automatically by a computer.

* * * * *